(12) United States Patent
Areskogh et al.

(10) Patent No.: US 11,084,931 B2
(45) Date of Patent: Aug. 10, 2021

(54) ACTIVATED LIGNIN COMPOSITION, A METHOD FOR THE MANUFACTURING THEREOF AND USE THEREOF

(71) Applicant: Stora Enso OYJ, Helsinki (FI)

(72) Inventors: Dimitri Areskogh, Stockholm (SE); Ashar Zafar, Årsta (SE)

(73) Assignee: Stora Enso OYJ, Helsinki (FI)

( * ) Notice: Subject to any disclaimer, the term of this patent is extended or adjusted under 35 U.S.C. 154(b) by 0 days.

(21) Appl. No.: 15/562,929

(22) PCT Filed: Apr. 1, 2016

(86) PCT No.: PCT/IB2016/051871
§ 371 (c)(1),
(2) Date: Sep. 29, 2017

(87) PCT Pub. No.: WO2016/157141
PCT Pub. Date: Oct. 6, 2016

(65) Prior Publication Data
US 2018/0086916 A1 Mar. 29, 2018

Related U.S. Application Data

(60) Provisional application No. 62/141,930, filed on Apr. 2, 2015.

(51) Int. Cl.
C08L 97/00 (2006.01)
C09J 161/12 (2006.01)
B27N 3/00 (2006.01)
C08G 8/38 (2006.01)
C09J 197/00 (2006.01)
(Continued)

(52) U.S. Cl.
CPC ............ *C08L 97/005* (2013.01); *B27N 3/002* (2013.01); *C08G 8/38* (2013.01); *C09J 161/12* (2013.01); *C09J 197/005* (2013.01); *C08K 5/0025* (2013.01); *C08K 5/07* (2013.01); *C08L 2201/54* (2013.01)

(58) Field of Classification Search
CPC .................................................. C08L 97/005
See application file for complete search history.

(56) References Cited

U.S. PATENT DOCUMENTS 3,227,667 A 1/1966 Moffitt et al.
4,105,606 A 8/1978 Forss et al.
(Continued)

FOREIGN PATENT DOCUMENTS

CN 103145999 A 6/2013
CN 103467683 A 12/2013
(Continued)

OTHER PUBLICATIONS

IKA Ultra-Turrax T-50 Homogenizer product data sheet Obtained Aug. 1, 2019 at: https://www.ika.com/en/Products-Lab-Eq/Dispersers-Homogenizer-csp-177/T-50-digital-ULTRA-TURRAX-cpdt-3787000/?gclid=EAIaIQobChMIi5aQpKDi4wIVxZ6zCh3L_QGWEAAYASAAEgKWBfD_BwE (Year: 2019).*
(Continued)

*Primary Examiner* — Arrie L Reuther
(74) *Attorney, Agent, or Firm* — Greer, Burns, Crain, Ltd.

(57) ABSTRACT

The present invention relates to an activated lignin composition, its manufacture and its use thereof. It also relates to a resin comprising lignin, its manufacture and use.

6 Claims, 3 Drawing Sheets

Viscosity development during synthesis of resins in Example 1 and Example 2.

(51) Int. Cl.
*C08K 5/00* (2006.01)
*C08K 5/07* (2006.01)

(56) References Cited

U.S. PATENT DOCUMENTS

| | | | |
|---|---|---|---|
| 4,303,562 | A | 12/1981 | Hollis, Jr. et al. |
| 5,008,378 | A | 4/1991 | Dimitri |
| 5,202,403 | A | 4/1993 | Doering |
| 9,605,382 | B2 | 3/2017 | Virtanen |
| 2011/0245381 | A1* | 10/2011 | Winterowd ............ C08L 61/06 524/14 |
| 2014/0024927 | A1 | 1/2014 | Piferi |
| 2014/0249271 | A1* | 9/2014 | Pietarinen ............. C08H 6/00 524/799 |
| 2015/0096700 | A1 | 4/2015 | Heiskanen et al. |

FOREIGN PATENT DOCUMENTS

| | | |
|---|---|---|
| CN | 104245799 A | 12/2014 |
| CN | 104285006 A | 1/2015 |
| CN | 104411772 A | 3/2015 |
| CN | 105051289 A | 11/2015 |
| GB | 1504451 | 3/1978 |
| WO | 199218557 | 10/1992 |
| WO | 199321260 | 10/1993 |
| WO | 201314454 A1 | 10/2013 |
| WO | 2013144453 A1 | 10/2013 |

OTHER PUBLICATIONS

International Search Report for PCT/IB2016/051871, dated Jun. 27, 2016.
Nair, S.S. et al, "High Shear Homogenization of Lignin to Nanolignin and Thermal Stability of Nanolignin-Polyvinyl Alcohol Blends", ChemSusChem 2014, pp. 3513-3520, 7.
Liu, Gang-yong et al., Effect of Urea on the Properties of Lignin Phenol Formaldehyde Adhesive, Fine Chemicals, vol. 25, No. 9, Sep. 2008.
Ouyang Xin Ping et al., "Preparation of Lignin-Modified Phenol-Formaldehyde Resin Adhesive," Journal of South China University of Technology, vol. 39, No. 11, Nov. 1, 2011, pp. 22-29.
Nair, Sandeep, et al., High Shear Homogenization of Lignin to Nanolignin and Thermal Stability of Nanolignin-Polyvinyl Alcohol Blends, ChemSusChem 2014, 7, 3513-3520.

* cited by examiner

Figure 1:
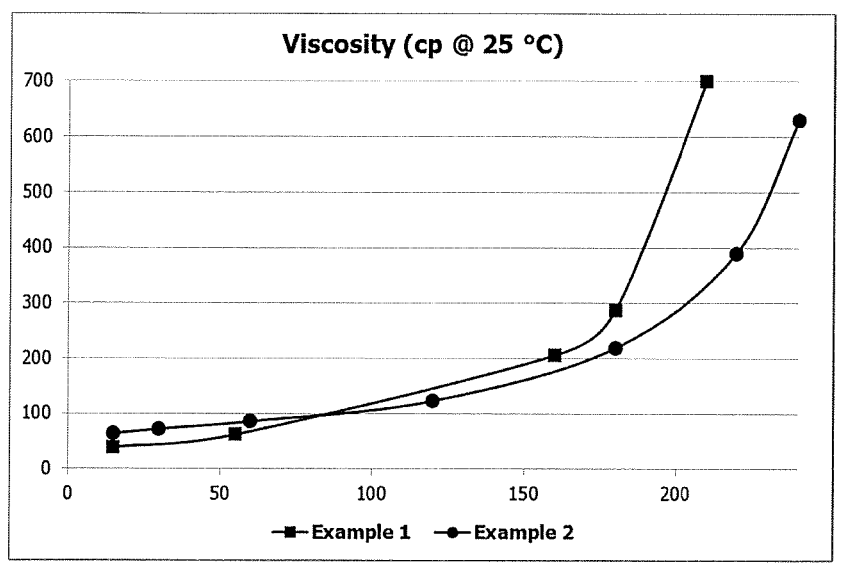

Figure 1: Viscosity development during synthesis of resins in Example 1 and Example 2.

Figure 2:
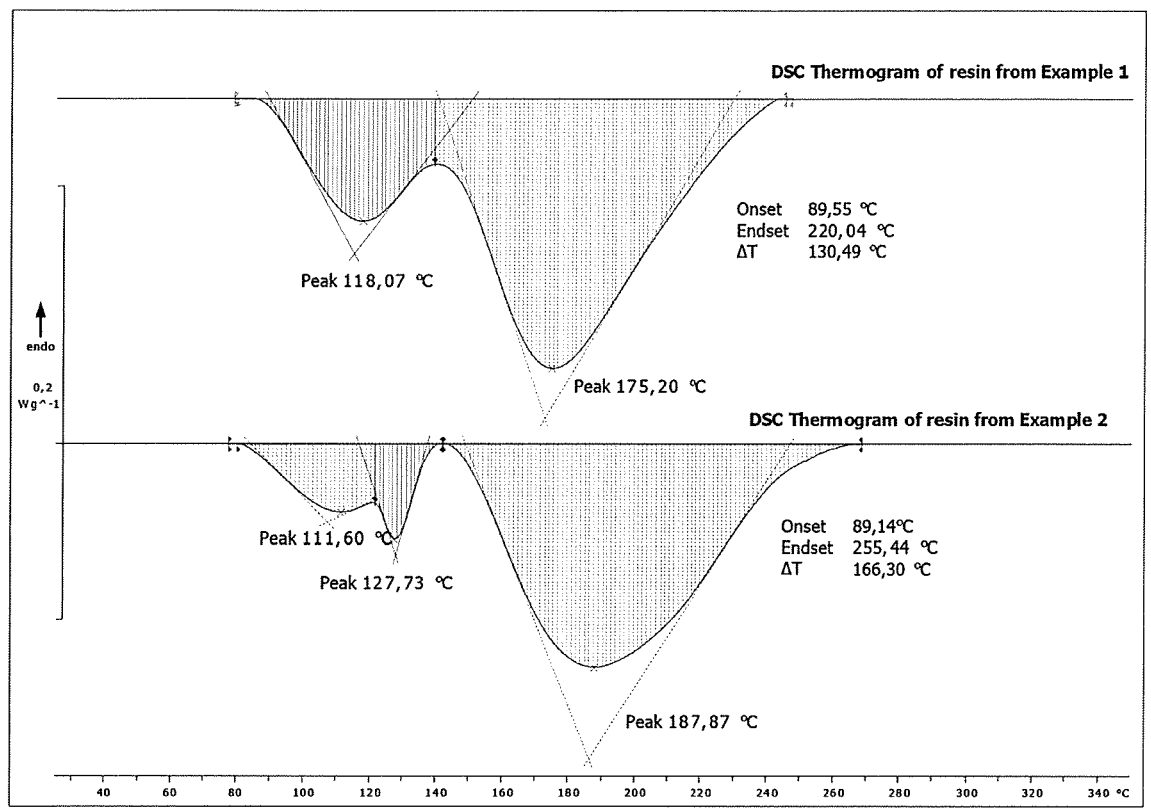

Figure 2: DSC thermograms of resins produced in Example 1 and Comparative Example 2

Figure 3:
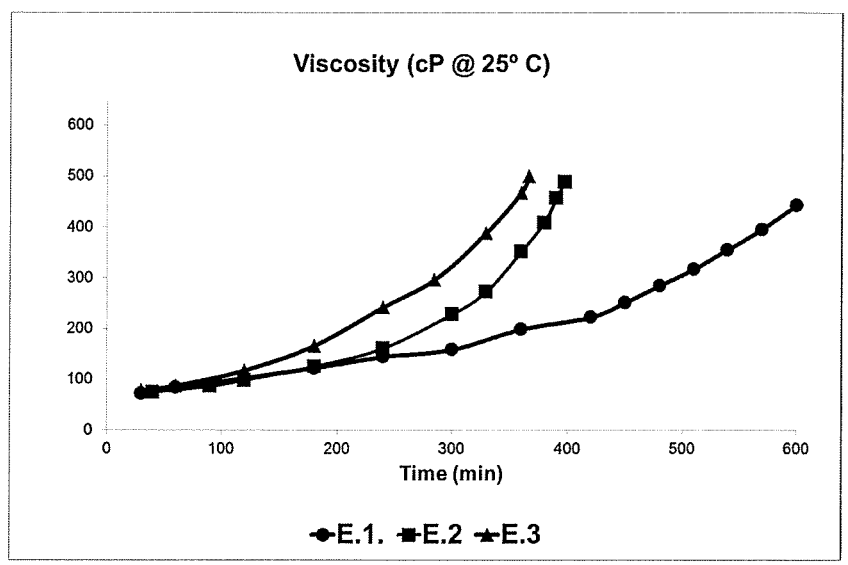

Figure 3 shows: Viscosity developments of resins cooked in Example 3, 4 and 5.

ACTIVATED LIGNIN COMPOSITION, A METHOD FOR THE MANUFACTURING THEREOF AND USE THEREOF

This application is a U.S. National Stage under 35 U.S.C. § 371 of International Application No. PCT/IB2016/051871, filed Apr. 1, 2016, which claims priority to U.S. provisional patent application No. 62/141,930 filed Apr. 2, 2015.

FIELD OF INVENTION

The present invention relates to an activated lignin composition, a method for the manufacturing of said composition and use thereof in different application areas, such as in wood adhesives, binders and glues. It also relates to a method for the manufacturing of and use of an adhesive. Additionally, it also relates to a resin comprising said activated lignin, its manufacture and use.

BACKGROUND

Lignin, an aromatic polymer is a major constituent in e.g. wood, being the most abundant carbon source on Earth second only to cellulose. In recent years, with development and commercialization of technologies to extract lignin in a highly purified, solid and particularized form from the pulp-making process, it has attracted significant attention as a possible renewable substitute to primarily aromatic chemical precursors currently sourced from the petrochemical industry.

Lignin, being a polyaromatic network has been extensively investigated as a suitable substitute for phenol during production of phenol-formaldehyde adhesives. These are used during manufacturing of structural wood products such as plywood, oriented strandboard and fiberboard. During synthesis of such adhesives, lignin, partially replaced by phenol, is reacted with formaldehyde in the presence of either basic or acidic catalyst to form a highly cross-linked aromatic resins termed novolacs (when utilizing acidic catalysts) or resoles (when utilizing basic catalysts). Currently, only limited amounts of the phenol can be replaced by lignin due to the lower reactivity of lignin.

"High Shear Homogenization of Lignin to Nanolignin and Thermal Stability of Nanolignin-Polyvinyl Alcohol Blends", Nair Sundeep. S et al, ChemSusChem 2014, 7, 3513-3520, DOI: 10.1002/cssc.201402314, discloses high shear treatment of lignin.

WO2013144454 further discloses activation of lignin using heat and alkali.

Therefore there is still a need to increase the reactivity of lignin in order to improve its performance as a phenol substitute in phenol-formaldehyde resins. Furthermore, there is a need to enable processing of lignin to achieve a composition which can be handled safely with minimal combustion and respiratory hazards.

SUMMARY OF INVENTION

The present invention provides according to a first aspect an activated lignin composition, such as in the form of a dispersion, comprising one or more aqueous or water soluble dispersants and catalysts, and lignin, such as an alkaline lignin, wherein said lignin has an average particle size of from about 0.1 nm to about 10000 nm, and preferably in a range from about 100 to about 1000 nm.

The present invention also provides according to a second aspect use of a composition according to the first aspect in synthesis of wood adhesives such as lignin-phenol-formaldehyde resins.

The present invention also provides according to a third aspect a method for the making an activated lignin composition according to the first aspect comprising the following steps:
  i) providing a lignin, such as an alkaline lignin,
  ii) adding one or more aqueous or water soluble dispersant(s), such as water,
  iii) adding an alkali metal-based or acidic catalyst, such as NaOH,
  iv) optionally adding one or more substituted and/or non-substituted hydroxybenzene compounds, such as phenol, and
  v) mixing said components and at the same time reducing the particle size of the lignin, preferably by using high shear treatment whereby said components are subjected to high shear and flow, thus providing said composition.

The present invention also provides according to a fourth aspect, a composition in the form of a dispersion obtainable by the method according to the third aspect.

The present invention also provides according to a fifth aspect use of the composition according to the fourth aspect in lignin-phenol formaldehyde resin, which may be used as a wood adhesive.

The present invention also provides according to a sixth aspect a method for manufacturing a lignin-phenol formaldehyde resin comprising the following steps:
  a) providing an activated lignin composition according to the first or fourth aspect,
  b) adding a aldehyde-based crosslinking agent, such as formaldehyde, to said composition,
  c) optionally adding additionally one or more substituted and/or non-substituted hydroxybenzene compounds, such as phenol, to said composition until a previously specified lignin/phenol ratio is obtained,
  d) optionally adding additional alkali metal-based or acidic catalyst and
  e) heating said composition to obtain a lignin-phenol-formaldehyde resin. Said resin may have a previously determined viscosity. Said resin may be used as a binder or as an adhesive (or as part of an adhesive).

The present invention also provides according to a seventh aspect, a resin composition, in the form of a lignin-phenol-formaldehyde resin, obtainable by the method according to the sixth aspect.

The present invention also provides according to an eighth aspect a method for manufacturing a lignin-phenol formaldehyde resin comprising the following steps:
  A1) providing a lignin, such as an alkaline lignin,
  A2) adding one or more aqueous or water soluble dispersant(s), such as water,
  A3) adding, before or after step A5), an alkali metal-based or acidic catalyst, such as NaOH,
  A4) mixing said components and at the same time reducing the particle size of the lignin, preferably by using high shear-mixing treatment, whereby said components are subjected to high shear and flow,
  A5) adding one or more substituted and/or non-substituted hydroxybenzene compounds, such as phenol,
  A6) adding before or after step A5) an aldehyde-based crosslinking agent, such as formaldehyde, to said composition, and A7) heating and optionally maintaining high-shear mixing of said composition thus providing a lignin-phenol formaldehyde resin.

The present invention also provides according to a ninth aspect a resin composition, in the form of a lignin-phenol-formaldehyde resin composition, obtainable by the method according to the eighth aspect.

The present invention also provides according to a tenth aspect, use of a resin composition according to a seventh or ninth aspect, in engineered wood products including, but not limited to, plywood, particle board, wafer board, gluelam beams, structural composite lumber, oriented strand board (OSB), oriented strand lumber (OSL) and other applications including, but not limited to, laminates, insulation and molding compounds. The resin composition may also be used in impregnation application, as a coating, for strengthening plastic, for producing a compressed casting, a laminate or a lacquer, or as said for gluing a wood product. For the application area oriented strand boards (OSBs), resins made according to the third and eighth aspect involving usage of urea is preferred whereby said usage is further mentioned in preferred embodiments of the third and eighth aspect below.

DETAILED DESCRIPTION OF THE INVENTION

It is intended throughout the present description that the expression "lignin" embraces any lignin which may be used for making dispersions. Preferably the lignin is an alkaline lignin generated in e.g. the Kraft process. The lignin may preferably be obtained by using the process disclosed in WO2006031175.

It is intended throughout the present description that the expression "substituted and/or non-substituted hydroxybenzene compounds" embraces any such compound useful in the context of the present invention. Examples thereof are phenol, cresol, resorcinol and combinations thereof, whereby phenol is preferred.

It is intended throughout the present description that the expression "aldehyde-based crosslinking agent" embraces any such compound useful in the context of the present invention. An aldehyde-based crosslinking agent which is preferred is formaldehyde. Said formaldehyde may also be present in a solution also containing methanol.

It is intended throughout the present description that the expression "alkali metal-based catalyst" embraces any such catalyst useful in the context of the present invention. Examples thereof are sodium hydroxide, potassium hydroxide and any mixture thereof whereby sodium hydroxide is preferred. According to a preferred embodiment of the third aspect of the present invention the high shear treatment involves using a mixer with a rotor-stator setup either in batch- or in inline configuration whereby the rotor-stator setup comprises a rotational element which turns at high speeds with a stationary element or said setup consists of disc-type rotational element with saw teeth and/or star-shaped rotational element which turns at high speeds without a stationary element, thus generating high shear and turbulence. Said high shear mixing may involve rotational speeds of above at least about 100 rpm, preferably above at least about 1 000 rpm, most preferred above at least about 10 000 rpm. The high-shear mixing may also be performed during the resin synthesis.

According to a preferred embodiment of the sixth aspect of the present invention, the activated lignin composition, such as in the form of a dispersion, is manufactured essentially simultaneously with the manufacturing of the resin. The method for manufacturing the activated lignin composition may be as set out in the third aspect of the present invention. In one variant of said embodiment the steps i) through v) in the third aspect may thus precede steps b) through e) in the sixth aspect.

According to a preferred embodiment of the sixth aspect of the present invention the addition of alkali metal-based or acidic catalyst precedes the addition of the aldehyde-based crosslinking agent.

According to a preferred embodiment of the sixth aspect of the present invention said method also comprises a step f) whereby adding urea. According to a preferred embodiment of the eighth aspect of the present invention, step A6) the addition of an aldehyde-based crosslinking agent involves when added after A5) additional mixing and optionally an additional addition of alkali metal-based or acidic catalyst.

According to a preferred embodiment of the eighth aspect of the present invention, the one or more substituted and/or non-substituted hydroxybenzene compounds, such as phenol, is added to said composition until a previously specified lignin/phenol ratio is obtained.

According to a preferred embodiment of the eighth aspect of the present invention said method also comprises a step A8) whereby adding urea.

The invention is further described in the following examples, together with the appended figures, which do not limit the scope of the invention in any way.

Preferred features of each aspect of the invention are as for each of the other aspects mutatis mutandis. The prior art document(s) mentioned herein are incorporated to the fullest extent permitted by law.

Embodiments of the present invention are described as mentioned in more detail with the aid of examples of embodiments, together with the appended figures, the only purpose of which is to illustrate the invention and are in no way intended to limit its extent.

FIGURES

FIG. 1 discloses viscosity development.
FIG. 2 discloses thermograms.
FIG. 3 discloses viscosity developments.

EXAMPLES

Example 1

Lignin-phenol-formaldehyde resin was synthesized with a degree of substitution of the phenol with lignin equal to about 50% by weight. In the first step, lignin dispersion was prepared by mixing of 40 g of lignin (96% lignin), 53 g of water and 11.5 g of sodium hydroxide for 30 minutes using a high shear-dispersing equipment, in this case an IKA T25 ULTRA TURRAX High-Speed Homogenizer equipped with a S25 N18G dispersing element in a glass reactor equipped with condenser, overhead stirrer and thermometer. In the $2^{nd}$ step, 40 g of phenol (99% Phenol) and 124 g of formaldehyde solution (37% formaldehyde in methanol) were added to the glass reactor. The formaldehyde to phenol ratio was set to 1.8 to facilitate detection of sufficient levels of free monomers. The pH of the solution was adjusted to 11.5 with the addition of an aqueous solution of 45% sodium hydroxide. The reaction mixture was cooked at 80° C. until the viscosity of the reaction mixture reached a certain viscosity. The viscosity was measured at 25° C. using a Brookfield DV-II+ LV viscometer. Viscosity development is illustrated in FIG. 1. After the reaction mixture reached the certain viscosity, it was cooled rapidly to room temperature using a cold water bath. Free monomer content was determined by means of BSTFA- (N,O-Bistrifluoroacetamide) and PFBHA- (o-(2,3,4,5,6-pentafluorobenzyl)hydroxylamine hydrochloride) derivatization for free phenol and free formaldehyde respectively followed by analysis and quantification by GC/MS.

Example 2—Comparative Example

Lignin-phenol-formaldehyde resin was synthesized with a degree of substitution of the phenol with lignin equal to about 50% by weight. 40 g of lignin (96% lignin), 40 g of phenol (99% Phenol), 40 g of water and 124 g of formaldehyde solution (37% formaldehyde in methanol) were combined in a glass reactor equipped with condenser, overhead stirrer and thermometer. The formaldehyde/phenol-ratio was set to 1.8 to facilitate detection of sufficient levels of free monomers. The pH of the solution was adjusted to 11.5 with the addition of an aqueous solution of 45% sodium hydroxide. The reaction mixture was cooked at 80° C. until the viscosity of the reaction mixture reached a certain viscosity. The viscosity was measured at 25° C. as described in Example 1. After the reaction mixture reached the certain viscosity, it was cooled rapidly to room temperature using a cold water bath. Free monomer content was determined by means of BSTFA- (N,O-Bistrifluoroacetamide) and PFBHA- (o-(2,3,4,5,6-pentafluorobenzyl)hydroxylamine hydrochloride) derivatization for free phenol and free formaldehyde respectively followed by analysis and quantification by GC/MS.

Differential scanning calorimetry (DSC) analysis of resins from Example 1 and Example 2 were performed on a Mettler Toledo DSC1 instrument. Prior to analysis, water was removed by freeze-drying to avoid signals from water vaporization which would make it difficult to observe any phase transitions originating from the resins. Approximately 10 mg of sample was weighted in a 100 µl aluminum pan with a punctured lid to enable gas escape. Temperature was ramped from 25° C. to 350° C. at a rate of 4° C./min. The obtained thermograms (see FIG. 2) were further processed in Mettler Toledo STARe software (v. 10.00) by normalization to sample size and baseline correction using the "tangential baseline" type. Surprisingly it was found that viscosity development during synthesis of resin from Example 1 was clearly more advanced than that of resin from Example 2 indicating a much faster reaction.

In addition, the resin prepared in Example 1 contained significantly lower levels of free formaldehyde, displaying increased consumption of formaldehyde during synthesis. This particular feature seen in Example 1 is a clear indication that lignin is activated towards formaldehyde which would also imply that higher lignin substitution levels than what was demonstrated can be achieved. This is also reflected in Table 1.

Furthermore it was found that the resin from Example 1 yielded a more uniform DSC thermogram with only two distinguishable exothermic signals (at 118° C. and 175° C.) while the resin from Comparable Example 1 produced three peaks (111° C., 127° C. and 187° C.). Presence of additional signals in the first exothermic peak is a clear indication of a non-uniform curing behaviour where interfering side-reactions are occurring. Furthermore, the difference between onset and endset temperatures, ΔT is an additional measure of rate of curing. The higher value of ΔT, the lower is rate of curing. It is thus evident that resin from Example 1 had a significant faster rate of curing.

Example 3 (E.1)

Lignin-phenol-formaldehyde resin was synthesized with a degree of substitution of the phenol with lignin equal to about 50% by weight. 42.6 g of lignin (96% lignin), 40 g of phenol (99% Phenol), 37.4 g of water and 110 g of 37% formaldehyde solution were combined in a glass reactor equipped with condenser, overhead stirrer and thermometer. The formaldehyde to phenol ratio was set to 1.6. The pH of the solution was adjusted to 11.5 with the addition of an aqueous solution of 45% sodium hydroxide. The reaction mixture was cooked at 80° C. until the viscosity of the reaction mixture reached a certain viscosity. After the reaction mixture reached the certain viscosity, it was cooled rapidly to room temperature using a cold water bath. Viscosity development is illustrated in FIG. 3.

The final resin was investigated by means of gel time analysis and dynamic light scattering. Gel time was determined using a Techne GT-6 Gelation Timer with a 15 mm plunger which was submerged in the resin and moved in a vertical motion. 25 g of resin was transferred to a tube and heated to 100° C. Gel time was determined automatically as the time at which the resin gelled and the plunger was no longer able to move through the resin. An average of two readings is reported in Table 2.

Dynamic light scattering analysis and particle z-average size was performed using a Malvern Zetasizer Nano ZS instrument 15 min into the reaction and at the end of the reaction when the resin reached the target viscosity. Approximately 50 µl of the resin was dissolved in 12 ml 3M NaCl and shaken until no visible aggregates were present. The sample was scanned 8 times. Reported z-average values, standard deviation and relative standard deviation are listed in Table 3.

Example 4 (E.2)

Lignin-phenol-formaldehyde resin was synthesized with a degree of substitution of the phenol with lignin equal to about 50% by weight. In the first step, lignin dispersion was prepared by mixing of 42.6 g of lignin (96% lignin), 40 g of phenol, 37.4 g of water and 23 g of 45% sodium hydroxide solution for 90 minutes using a high shear-dispersing equipment, in this case an IKA T25 ULTRA TURRAX High-Speed Homogenizer equipped with a S25 N18G dispersing element in a glass reactor equipped with condenser, overhead stirrer and thermometer. In the 2nd step, 110 g of 37% formaldehyde solution were added to the glass reactor and mixed with a propeller stirrer instead of high speed homogenizer. The formaldehyde to phenol ratio was set to 1.6.

The pH of the solution was adjusted to 11.5 with the addition of an aqueous solution of 45% sodium hydroxide. The reaction mixture was cooked at 80° C. until the viscosity of the reaction mixture reached a certain viscosity. The viscosity was measured at 25° C. using a Brookfield DV-II+ LV viscometer. After the reaction mixture reached the certain viscosity, it was cooled rapidly to room temperature using a cold water bath. Viscosity development is illustrated in FIG. 3.

The final resin was investigated by means of gel time analysis and dynamic light scattering as described in Example 2.

Example 5 (E.3)

Lignin-phenol-formaldehyde resin with a degree of substitution of the phenol with lignin equal to about 50% by weight. The formaldehyde to phenol ratio was set to 1.6.

Firstly, 42.6 g of lignin (96% lignin), 40 g of phenol, 37.4 g of water and 110 g of 37% formaldehyde solution were added to the glass reactor and mixed with IKA T25 ULTRA TURRAX High-Speed Homogenizer equipped with a S25 N18G dispersing element. Secondly, 42 g of 45% sodium hydroxide solution was added slowly to reaction mixture to control the exothermic reaction and the pH of the solution was adjusted to 11.5 with the addition of an aqueous solution of 45% sodium hydroxide. The reaction mixture kept under high-intensity mixing using an IKA T25 ULTRA TURRAX High-Speed Homogenizer cooked at 80° C. until the viscosity of the reaction mixture reached a certain viscosity. The viscosity was measured at 25° C. using a Brookfield DV-II+ LV viscometer. After the reaction mixture reached the certain viscosity, it was cooled rapidly to room temperature using a cold water bath. Viscosity development is illustrated in FIG. 3. Gel time is reported in Table 2.

Example 6 (E.4)

Lignin-phenol-formaldehyde resin with a degree of substitution of the phenol with lignin equal to about 50% by weight. The formaldehyde to phenol ratio was set to 1.6.

Firstly, 10.6 g of lignin (96% lignin), 10 g of phenol, 9.1 g of water and 27.6 g of 37% formaldehyde solution were added to a reaction vessel in a formulation workstation. Secondly, 10 g of 45% sodium hydroxide solution was added slowly to reaction mixture to control the exothermic reaction and the pH of the solution was adjusted to 11.5 with the addition of an aqueous solution of 45% sodium hydroxide. The reaction mixture kept under high-intensity mixing using a dissolver disc and cooked at 80° C. until the viscosity of the reaction mixture reached a certain viscosity. The viscosity was measured at 25° C. using a Brookfield DV-II+ LV viscometer. After the reaction mixture reached the certain viscosity, it was cooled rapidly to room temperature using a cold water bath.

Example 7 (E.5)

Lignin-phenol-formaldehyde resin for plywood panel production was cooked in a 5 L glass reactor and mixed with IKA T50 ULTRA TURRAX High-Speed Homogenizer equipped with a S50N-G45F dispersing element. When the reaction mixture reached the certain viscosity, it was cooled rapidly to room temperature using a cold water bath. The included components in the composition of this example were increased fivefold from that of Example 5 above to obtain a lignin-phenol-formaldehyde resin with a degree of substitution of the phenol with lignin equal to about 50% by weight and a formaldehyde to phenol ratio of 1.6.

Example 8 (E.6)

Lignin-phenol-formaldehyde resin containing urea for OSB panel was cooked in a 5 L glass reactor with a degree of substitution of the phenol with lignin equal to about 40% by weight.

Firstly, 337 g of lignin (95% lignin), 484 g of phenol, 396 g of water and 1276 g of 37% formaldehyde solution were added to the glass reactor and mixed with IKA T50 ULTRA TURRAX High-Speed Homogenizer.

Secondly, 231 g of NaOH solution (45%) was added slowly to prevent excessive heat development and giving a pH of 10.2-10.5. The temperature was kept constant at 60° C. for 30 minutes and was then increased to 80° C. The viscosity was measured at 25° C. using a Happier viscometer. Maintain the temperature of the reaction mixture at 80° C. until it reached a viscosity of 400-450 cP.

At this stage, more 165 g of sodium hydroxide solution was added to the mixture giving the pH of 11.3-11.5 and the reaction temperature was lowered to 75° C.

When the desired viscosity (400-450 cP) was achieved, the reaction was cooled down to room temperature (30° C.) and 110 g of urea was added to the reaction mixture. The reaction was stopped when urea was completely mixed.

Example 9 (E.7)

Lignin-phenol-formaldehyde resin containing urea for OSB panel was cooked in a 5 L glass reactor and mixed with pitched blade stirrer with a degree of substitution of the phenol with lignin equal to about 40% by weight.

Firstly, 337 g of lignin (95% lignin), 484 g of phenol, 396 g of water and 1276 g of 37% formaldehyde solution were added to the glass reactor and mixed.

Secondly, 231 g of NaOH solution (45%) was added slowly to prevent excessive heat development and giving a pH of 10.2-10.5. The temperature was kept constant at 60° C. for 30 minutes and was then increased to 80° C. The viscosity was measured at 25° C. using a Happier viscometer. The temperature of the reaction mixture was maintained at 80° C. until it reached a viscosity of 400-450 cP.

At this stage, more 165 g of sodium hydroxide solution was added to the mixture giving the pH of 11.3-11.5 and the reaction temperature was lowered to 75° C.

When the desired viscosity (400-450 cP) was achieved, the reaction was cooled down to room temperature (30° C.) and 110 g of urea was added to the reaction mixture. The reaction was stopped when urea was completely mixed.

Example 10

Veneers were sawn to 550×550 mm$^2$ size and conditioned in 20° C., 65% RH prior to manufacture. Resin from Example 7 was mixed according to Table 4.

Target resin content was 180 g resin/m$^2$ with spread on one side. Hot pressing was performed at 140° C. with a pressure of 1 MPa, with repeated release of steam during the first 4 minutes. The total pressing time was 10 minutes. After hot-pressing, the boards were cooled between two aluminium plates at room temperature.

Prior to evaluation all samples were conditioned according to EN636 class 3 test method. Shear strength was evaluated according to EN314 test method. Average data from 3 boards is presented in Table 5.

Example 11

Spruce boards were cut into 190 mm long pieces and strands were manufactured in a disk flaker and sieved. The impregnation of the wood strands was performed in a rotating drum batch using the resin from Example 8 or 9 which was diluted with water to reach a specific viscosity. The impregnated OSB strands were spread and hot-pressed at 160° C. for a total pressing time of 10 min to achieve boards measuring 540×540 mm$^2$.

After hot-pressing, the boards were cooled between two aluminium plates at room temperature. Prior to evaluation all samples were conditioned at 20° C. and 65% RH. Internal bonding was evaluated before and after cyclic test conditions specified in V313 standard. Average data from 3 boards is presented in Table 6.

TABLE 1

Free monomer content of resins prepared in Examples 1 and 2.

| Sample | Free Phenol (% w/w) | Free Formaldehyde (% w/w) |
|---|---|---|
| Example 1 | 0.0 | 1.6 |
| Comparable Example 2 | 0.0 | 6.2 |

TABLE 2

Gel time

| Sample | Gel time (min) |
|---|---|
| Resin from Example 3 | 76 |
| Resin from Example 4 | 45 |
| Resin from Example 5 | 46 |

TABLE 3

Dynamic light scattering data

Resin from Example 2

After 15 min

| | |
|---|---|
| Z-Average (d · nm) | 260 |
| STD | 94 |
| RSD (%) | 36 |

At target viscosity

| | |
|---|---|
| Z-Average (d · nm) | 9500 |
| STD | 1400 |
| RSD (%) | 15 |

Resin from Example 4

After 15 min

| | |
|---|---|
| Z-Average (d · nm) | 250 |
| STD | 34 |
| RSD (%) | 13 |

At target viscosity

| | |
|---|---|
| Z-Average (d · nm) | 4100 |
| STD | 560 |
| RSD (%) | 14 |

TABLE 4

Plywood board composition

| Component | Amount [%] |
|---|---|
| Resin from Example 7 | 77.5 |
| Water | 8 |
| Olive seed flour | 10.7 |
| NaOH (35%) | 3.8 |

TABLE 5

Plywood board shear strength according to EN314 standard

| | Shear Strength (MPa) | | |
|---|---|---|---|
| Board # | Average | STD | Median |
| Average | 1.51 | 0.25 | 1.50 |

TABLE 6

OSB board densities, internal bond and residual strength after conditioning and aging according to V313 standard.

| | | After conditioning (20° C., 65% RH) | | After aging according to V313 standard | | |
|---|---|---|---|---|---|---|
| Board # | Density Average | Internal Bond Average | STD | Internal Bond AVERAGE | STD | Residual Strength |
| Board based on resin from Example 8 | | | | | | |
| Average of 3 boards | 707 | 0.76 | 0.13 | 0.51 | 0.06 | 68% |
| STD | 16 | 0.02 | | 0.06 | | |
| Board based on resin from Example 9 | | | | | | |
| Average of 3 boards | 691 | 0.63 | 0.10 | 0.41 | 0.07 | 65% |
| STD | 18 | 0.03 | — | 0.03 | — | — |

Various embodiments of the present invention have been described above but a person skilled in the art realizes further minor alterations, which would fall into the scope of the present invention. The breadth and scope of the present invention should not be limited by any of the above-described exemplary embodiments, but should be defined only in accordance with the following claims and their equivalents. For example, any of the above-noted compositions or methods may be combined with other known methods. Other aspects, advantages and modifications within the scope of the invention will be apparent to those skilled in the art to which the invention pertains.

The invention claimed is:

1. A method for making an activated lignin composition, the method comprising the following steps:
   i) providing a lignin,
   ii) adding an aqueous dispersant,
   iii) adding an alkali metal-based catalyst to the lignin, wherein the alkali metal-based catalyst comprises hydroxide, and
   iv) mixing said components and at the same time reducing the particle size of the lignin, whereby said components are subjected to high shear and flow, thus providing said activated lignin composition,
   wherein the mixing step includes using a high shear treatment that involves using a mixer with a rotor-stator setup either in batch- or in inline configuration whereby the rotor-stator setup comprises a rotational element which turns at high speeds of above at least about 100 rpm with a stationary element or said setup consists of disc-shaped rotational element comprising saw teeth and/or star-shaped rotational element which turns at high speeds without a stationary element, thus generating high shear and turbulence.

2. A method for the making an activated lignin composition according to claim 1 wherein the high shear treatment involves rotational speeds of above at least about 1,000 rpm.

3. A method for the making an activated lignin composition according to claim 1 wherein said lignin is an alkaline lignin.

4. A method for the making an activated lignin composition according to claim 1 wherein said alkali metal-based catalyst comprises NaOH.

5. A method for the making an activated lignin composition according to claim 1 further comprising the step of adding one or more substituted and/or non-substituted hydroxybenzene compounds before the mixing step.

6. A method for the making an activated lignin composition according to claim 1 wherein the high shear treatment involves rotational speeds of above at least about 10,000 rpm.

* * * * *